United States Patent [19]
Peasley et al.

[11] 3,984,322
[45] Oct. 5, 1976

[54] SEWAGE TREATMENT APPARATUS

[75] Inventors: Howard P. Peasley; Lawrence A. McKinney, both of Richmond, Va.

[73] Assignee: Howard Peasley and Associates, Richmond, Va.

[22] Filed: May 20, 1975

[21] Appl. No.: 579,176

[52] U.S. Cl. ............................ 210/197; 210/218; 210/220; 210/256; 210/258; 210/266; 261/124

[51] Int. Cl.² .................... C02C 1/12; C02B 3/08

[58] Field of Search ............... 210/7, 14, 15, 170, 210/194, 200, 218, 220, 221 R, 256, 259, 261, 197, 258, 266; 261/124

[56] References Cited
UNITED STATES PATENTS

| | | | |
|---|---|---|---|
| 2,243,582 | 5/1941 | Soffe ........................ | 210/220 |
| 2,964,299 | 12/1960 | Bowers et al. ............ | 261/124 X |
| 3,118,835 | 1/1964 | Butler et al. .............. | 210/256 X |
| 3,126,333 | 3/1964 | Williams .................. | 210/256 X |
| 3,307,702 | 3/1967 | Mackrle et al. .......... | 210/200 |
| 3,560,376 | 2/1971 | Heil ......................... | 210/7 |
| 3,809,245 | 5/1974 | Kennedy ................. | 210/220 X |
| 3,815,750 | 6/1974 | Mackrle et al. .......... | 210/261 X |

*Primary Examiner*—Charles N. Hart
*Assistant Examiner*—Robert H. Spitzer
*Attorney, Agent, or Firm*—Dowell & Dowell

[57] ABSTRACT

An aerobic bacteria sewage treatment apparatus using compressed air to aerate activated sludge, and to cause it to circulate about a cylindrical clarification compartment placed in the apparatus in a way to provide a zone of relative quiescence in the flowing sewage from which the clarification compartment withdraws liquid and further separates solid matter therefrom, finally delivering a very well clarified effluent, the effluent pipe being placed in the clarification compartment such that heavier particles tend to sink away from it and lighter particles tend to rise above it, whereby the effluent is substantially free of solid matter.

10 Claims, 4 Drawing Figures

SEWAGE TREATMENT APPARATUS

FIELD OF INVENTION

This invention relates to sewage treatment apparatus of the type employing aerobic bacteria to digest biodegradable matter and employing improved apparatus for aerating the activated sludge and for separating and removing clarified water from the main digestion tank.

BACKGROUND AND PRIOR ART

The principles on which the present apparatus is based are well known in the prior art. For instance, the concept of making a treatment plant using aeration to sustain the bacterial digestion of wastes for small communities has been extensively discussed in a 1966 publication of the National Sanitation Foundation of Ann Arbor, Michigan, entitled "Package Plant Criteria Development" based on a study made for the Federal Water Pollution Control Administration, Demonstration Grant Project WPD-74. Moreover, the concept of bubbling air through the sewage in a manner to make it circulate is known in the prior art as evidenced by U.S. Pat. Nos. 3,348,687 to Foster; 3,627,136 to Mackre and 3,809,245 to Kennedy, these patents using such circulation to promote centrifugal separation of solid particles from the sewage so that relatively clearer water can be removed as an effluent.

THE INVENTION

The present invention provides an improved sewage treatment apparatus in which the main disposal of the sludge is achieved by bacterial digestion, rather than by mere separation, and in which the mechanical circulation of the sewage in a tank is performed for the purpose of keeping the solid materials from settling while the digestion is in progress and for the purpose of facilitating the drawing off of clarified effluent from the main stream without contamination of the effluent by the solids which are as yet undigested. The improvement is achieved by improving the shape and location of a clarification compartment within the main circulation tank and by providing it with filters, and with vent and effluent exit pipes disposed to achieve optimum clarification of the effluent, and by other features of improvement to be discussed below.

OBJECTS OF THE INVENTION

It is a principal object of the invention to provide an improved sewage treatment apparatus suitable for use in small communities, in private dwellings, and in isolated buildings such as rural schools wherein the apparatus achieves efficient performance with minimal power requirements and delivers highly clarified effluent which can be legally dumped into streams and storm sewers.

It is another major object of the invention to provide a clarification chamber in a vortex of circulating sewage, the chamber being so shaped as to create minimum turbulence in the circulating sewage at the point where the clarified effluent is to be drawn off into the chamber, and the interior of the chamber being shaped and vented, and provided with an effluent exit placed such that the effluent actually discharged is virtually free of solid matter.

Still another object of the invention is to provide an improved aerating pipe structure in which clogging is easily prevented and/or cured.

It is a more specific object of this invention to provide a cylindrical sewage treatment tank having a clarification chamber which extends at least over one-half the length of the tank, and in the present illustrated embodiment extends the full length thereof. The chamber is located just above the center of the vortex of the main tank, and aerating means is provided which bubbles air upwardly along one side of the cylindrical tank, thereby creating a circulation of the sewage within the tank together with aeration thereof sufficient to support the bacteria. The interior of the cylindrical tank and the exterior contour of the clarification chamber are so designed as to provide continuous circulation of the sewage around the clarification compartment in such a way as to provide minimal turbulence in the vicinity of a relatively quiescent zone substantially free of turbulence at the bottom of the clarification compartment where the clarified liquid is drawn upwardly into that compartment.

It is also an object of the invention to provide a quiescent condition within the clarification compartment so as to promote coagulation of sludge within the clarification compartment and just beneath it to cause the sludge to tend to settle out of the clarification compartment and fall back into the main circulation stream located below it. The tank and the clarification compartment are shaped and located so as to minimize the liklihood of dead spots in the main circulating tank where sludge might tend to accumulate and go septic, the latter condition tending to kill the bacteria and reduce the overall efficiency of the apparatus.

It is another feature of improvement that the clarification compartment is located somewhat above center of the cylindrical tank to that the rate of flow of the circulating sewage within the tank is slowed to a relatively quiescent rate immediately below the clarification compartment, but is speeded up above the clarification compartment so as to provide a scrubbing action by circulation across the top of the compartment to keep it free of settled solids.

It is another object of the invention to provide a clarification compartment which is located substantially within the vortex of the circulating sludge within the tank, the compartment opening downwardly to admit clarified liquid, and this downward opening permitting heavier sludge particles upon coagulation within the clarification compartment to settle downwardly out of the clarification compartment and fall back into the main circulating stream. At the same time, other sludge particles which are light, or which are made buoyant by air or gas bubbles attached thereto, will float upwardly into the top of the clarification compartment. As the gases accumulate in the clarification compartment they are drawn off through a vent which is located in the top of the compartment so that the level of the liquid in the clarification compartment is not displaced downwardly by trapped gases. As the particles of gas separate from solid matter in the top of the compartment, or are liberated as a result of digestion of the particles to which they were attached, the gas is vented off, rather than being allowed to accumulate. Moreover, foam does not tend to form to any considerable extent in the top of the clarification compartment since it is collapsed by the liquid pressure therein, and its gas is driven out through the air vent at the top of the clarification compartment. The effluent pipe through which clarified water is discharged from the apparatus is located approximately mid-way between the bottom of the clarification compartment where the liquid enters it, and the top of the clarification compartment where there may be some accumulation of lighter particles or particles made buoyant by gas and air bubbles attached thereto. The location of the effluent pipe mid-way between the top and bottom of the compartment is important, because at this level there tends to be a minimum of solid particles entrained in the liquid. One of the advantages of the present structure is that there is no need to provide pumping means for returning solid particles to the main stream of circulation since gravity accomplishes this purpose due to the placement of the clarification compartment with respect to the main stream of circulation. On the other hand, the foam accumulating in the top of the clarification compartment is continuously collapsed and eliminated and does not present a problem which must be specially dealt with as is necessary in many sewage treatment apparatus configurations of the prior art.

Still a further object of the invention is to provide sewage treatment apparatus in which access is provided by removing a cover at the top of the tank through which excess sludge and/or ash may be wasted by periodically stopping the circulation, allowing it to settle, and then removing it by pumping.

Still a further object of the invention is to provide a clarification compartment which is easily purged or cleaned by back-flushing the compartment by means of water driven into the compartment through its effluent pipe or through its air vent, which water will flush the clarification compartment and drive any solid materials therefrom which might otherwise tend to become attached and contaminate the interior of the compartment. This purging can be done either manually or automatically on a timed cycle.

Another important object of the invention is to provide a sewage treatment apparatus having a substantial surge capability such as can accomodate surges which occur at spaced time intervals such as during recess periods in a school. This surge capability is provided by having the apparatus normally operate at a liquid level spaced below the top of the circulating tank so that a higher than normal liquid level can be accomodated within the tank during peak intervals. It is another important feature of the invention that the size of the openings in the effluent line control the rate of discharge of effluent from the apparatus to a greater extent than the level of the liquid within the circulating tank, so that velocities of flow through the clarification compartment are kept below recognized settling rates.

The present apparatus lends itself to installations in the range of 500 to 30,000 gallons capacity in single units. Greater capacities can be achieved by connecting multiple units in parallel. The rate of air bubbled into the tank is controlled to sustain the bacteria according to criteria set forth in the above-mentioned National Sanitation Foundation article, and the proportions within the apparatus are such that this flow of air provides a circulation velocity sufficient to provide complete mixing of solids and the liquid. The average holding time in the tank to permit full digestion of the sewage should be about 24 hours.

Other objects and advantages of the invention will become apparent during the following discussion of the drawings, wherein:

THE DRAWING

Figure 1:
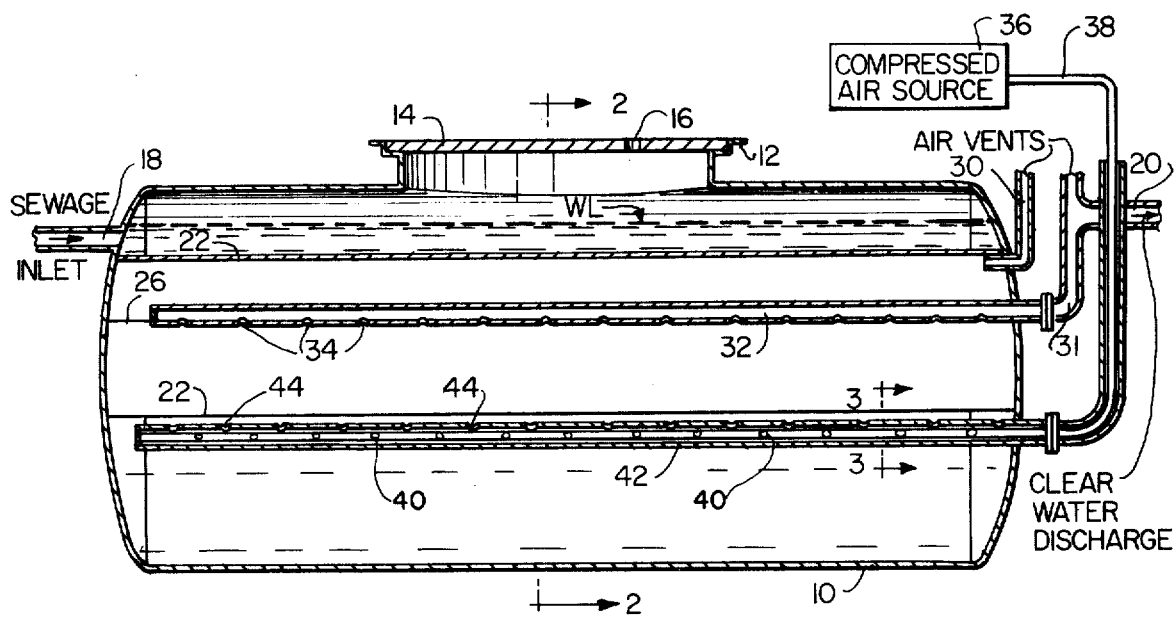
FIG. 1 is an axial sectional view taken through a sewage treatment apparatus according to the present invention.

Referring now to the drawings, FIG. 1 shows a sewage treatment tank 10 which is essentially cylindrical, although not necessarily exactly circular in cross-section, the tank having a flanged opening 12 at its upper end, the opening normally being closed by a removable manhole cover 14. The cover 14 has vent holes such as the hole 16 through it to permit escape of air and gases in order to maintain the liquid in the tank at atmospheric pressure. The tank has a sewage inlet 18, or inlets, at one end which inlet is connected to the raw sewage system (not shown) of a small community, rural school, or dwelling. The raw sewage enters the tank through the pipe 18, and clarified water is discharged from the system through the outlet pipe 20 at the other end of the tank, the level of the pipe 20 being disposed so that the minimal level to which the liquid in the tank can drain is the level of the water line WL, although the liquid level WL can build up higher within the surge zone thereabove in the tank during periods of peak use of the sewage system, as will hereinafter be explained more fully in connection with a description of the operation of the system.

Figure 2:
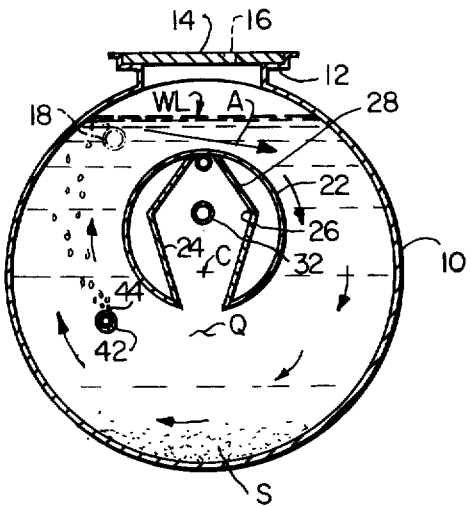
FIG. 2 is a cross-sectional view taken through the apparatus along line 2—2 of FIG. 1.

Within the tank 10 there is located a clarification compartment 22 comprising an essentially cylindrical outer housing extending either partially or the full length of the tank 10 and sealed at its ends, the compartment being about 10% of the main tank by volume so that the velocity of the liquid passing through the compartment will remain below recognized settling rates. The clarification compartment is circular on its outer surface so as to provide minimal eddy currents in the liquid as it circulates in the tank, but the inner construction of the clarification compartment 22 is diamond-shaped in cross-section as shown in FIG. 2 and comprises downwardly converging lower plates 24 joined at junction lines 26 with upwardly converging plates 28. As can be seen in FIG. 1, an air vent pipe 30 vents the peak of the upwardly converging plates 28 to the atmosphere at a level above the top of the tank. At about the same level as the junction 26, an effluent pipe 32 draws off clarified water from within the clarification chamber into a stand pipe 31, the upper end of which is vented to the atmosphere and an intermediate point of which is connected to the clear water discharge pipe 20 whose height with respect to the tank 10 determines the minimum water line WL within the tank at hours of non-peak use thereof, thus preventing draining of the tank. The effluent pipe 32 has a series of spaced holes 34 which face downwardly within the clarification chamber 22 and which draw off the clarified effluent into the stand pipe 31 and the discharge 20.

Figure 3:
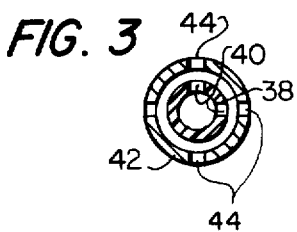
FIG. 3 is a cross-sectional view taken along the line 3—3 in FIG. 1.

Compressed air from a compressed air source 36 is delivered to a flexible plastic tubing 38, best seen in FIG. 3, which tubing has spaced holes 40 as can be seen also in FIG. 3. The plastic tubing 38 is pushed down inside a fixed perforated metal pipe 42, this pipe being provided with a series of holes 44 randomly located. Compressed air from the air source passes through the tubing 38, exits through the holes 40 which are located only in the vicinity of the horizontal portion of the pipe 42 and passes through the holes 44 so as to bubble upwardly through the liquid in the tank as shown in FIG. 2. This bubbling technique is of course an expedient which has been used extensively in the prior art. In the present aerobic sewage treatment system the air bubbles serve two purposes, namely, the biological purpose of supplying oxygen for sustaining the bacteria in the tank, and the mechanical purpose of causing the contents of the tank to mix and rotate in the direction of the arrows shown in FIG. 2, indicating clockwise circulation, the direction being of course arbitrarily selected.

It should be noted that the clarification chamber 22 is located somewhat above the center C of the tank 10, by a distance no greater than the radius of the compartment for purposes to be hereinafter discussed.

Figure 4:
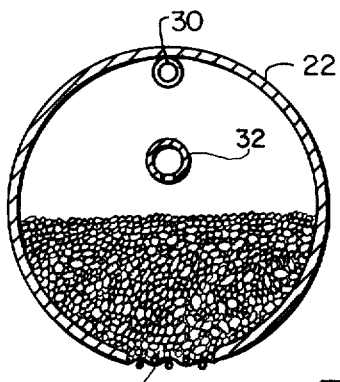
FIG. 4 is a cross-sectional view taken through a clarification compartment modified with respect to the apparatus as shown in FIG. 2.

In the modification of FIG. 4, the clarification chamber 22 and the tubes 30 and 32 are the same as are shown in FIG. 2, but plates 24 and 28 have been omitted and the lower portion of the chamber which opens into the main tank is provided with a filter bed comprising a horizontally disposed screen or apertured plate 46 which acts further to filter out any sizeable particles that might tend to float up into the clarification chamber, the screen 46 supporting a filter medium aggregate such as sand, coal or stones. This filter medium serves the important purpose of making the motion of the liquid in the vicinity of the entrance to the clarification chamber 22 more nearly quiescent. The filter medium in addition to the flow quieting function provides considerable surface area for bacterial attachment and growth to augment clarification similar to a trickling filter process well known in the art of sewage treatment.

OPERATION

The present sewage treatment apparatus operates on a well known principle based on the use of aerobic bacteria in the tank, which bacteria lives on the sewage in the water within the tank and is further sustained by oxygen furnished from the compressed air source 36. The bacteria digests and eliminates virtually all of the sewage, leaving only a slight ash comprising matter which cannot be digested by the bacteria. This sediment S or excess sludge can be occasionally removed from the tank by allowing it to settle and then removing it by inserting a pump after removing the manhole cover 14.

The tank remains filled with liquid to the level of the water line WL at all times, although this level can increase during intervals of peak use of the sewage system, for example, during recess periods at a school, the increased use of the facilities raising the liquid level higher into the upper surge zone of the tank. The rate of discharge of clear water from the discharge pipe 20 varies only slightly with liquid level, assuming that the level is high enough to fill the pipe 20, the diameters of the pipes 20 and 32 and the openings 34 having been selected to limit the flow of effluent in such a manner as to keep the velocities of the liquid in the clarification compartment below recognized settling rates before it is discharged. During this time the compressed air source 36 drives air through the plastic pipe 38 and the holes 40 and 44 and discharges the air upwardly from the pipe 42 as best illustrated in FIG. 2. This upward discharge causes the liquid within the tank to circulate. As determined by actual experimentation using working models of the sewage treatment apparatus, the best position for the pipe 42 is somewhat below the center line of the tank and halfway between the inner wall of the tank 10 and the outer cylindrical wall of the clarification compartment 22. If the pipe 42 is moved further out on the diameter of the main tank toward the periphery of the tank, the circulating flow of the liquid follows too closely the outer wall of the tank 10 and causes a rather low rate of flow directly across the top of the clarification compartment 22 on its outer surface. Because of the low rate of flow, solids from the sewage have a strong tendency to lie on top of the clarification compartment 22 and build up thereon, but this tendency was counteracted by moving the pipe 42 more nearly half-way between the outer wall 10 and the clarification compartment outer wall 22, apparently causing a flow in the direction of the arrow A to provide a scrubbing action across the top of the clarification compartment 22 which scrubbing action removes the build-up of solids on the top thereof.

The liquid in the tank circulates continuously, and it should be carefully noted that the clarification compartment is off-center, that is, raised above the center C of the tank 10 whereby a higher rate of flow occurs across the top of the compartment and the lower rate of flow across the bottom. Initially, in the first working models, the clarification compartment's outer shell 22 was elongated vertically in cross-section, rather than circular. However, it was discovered that this elongation created eddy currents in the liquid flowing across the bottom of the compartment in the vicinity of the reference character Q, and that such eddy currents tended to drive solid material upwardly into the clarification compartment, which is highly undesirable. Therefore, the compartment 22 was made cylindrical so that the movement across the bottom of it is very slow, almost at the point of quiescent. In addition, the bottom of the compartment in the modification shown in FIG. 4 has been provided with a filter screen or apertured plate 46 adapted to make the flow even more quiescent and further to reduce any tendency to move solid waste into the pipe 32. By these expedients, the rate of flow and the eddy current velocities in the quiescent zone Q have been kept below recognized settling rates for the types of sludge expected to be encountered. This quiescent zone is located in the natural central vortex of the circulating sewage in the tank 10. As a result, the heavy sludge settles down into the main circulating stream below the quiescent zone Q, and light-weight sludge which may also be made light by the attachment of air or gas bubbles, tends to float upwardly and is concentrated in the upper portion of the clarification compartment 22 in the vicinity of the peak between the converging plates 28 and near the air vent 30. In this area of the clarification compartment, the bacteria continues to digest these light particles which then either become heavier by being separated from the air or gas causing them to float, or else become completely digested by the bacteria. If the particles become heavier, they settle back downwardly through the clarification compartment, through the quiescent zone Q, and back into the main circulating stream of the liquid in the tank 10. The air or gas which is removed is of course vented through the vent 30. It frequently happens that there will be a zone of foam across the peak of the clarification compartment between the plates 28, and the level of this foam fluctuates as the solid matter is digested and as the gas is separated therefrom and escapes through the air vent 30.

The use of a circular main tank and a clarification compartment which is cylindrical on its outer surface and is located within the vortex of the main circulation of the tank, makes for a smooth and uninterrupted flow pattern of the liquid in the tank with no "dead" spots for sludge to accumulate and become septic, such septic conditions tending to kill the bacteria and diminish the plant efficiency. It is to be noted that the holes 34 in the effluent pipe 32 open downwardly so that the tendency to have only clarified liquids enter the pipe is augmented. The use of the air vent and effluent pipes 30 and 32 positioned in the clarification compartment as illustrated makes it possible to purge the entire clarification compartment from time to time by reversing the flow through these pipes, either running water into them in the downward direction from their vents as shown in FIG. 1 or pumping compressed air into them, either expedient tending to clean out any accumulation within the clarification compartment 22.

As stated above, the fact that the water line WL and the discharge pipe 20 are located below the top of the tank 10 provides the system with an additional surge capability in which the water level can be raised within the tank during periods of peak use, but will again subside during off-periods.

Another feature of the invention is the concept of using a perforated plastic hose 38 pushed into the rigid perforated pipe 42 from above as shown in FIG. 1, whereby the hose 38 can be easily pulled out of the tank for cleaning, and whereby the motion of the hose back and forth within the pipe 42 will tend to clean the exits 44 if they should become clogged, clogging being rather unlikely for these exits because of the continuous flow of air outwardly through them.

This invention is not to be limited to the exact forms shown in the drawing, for obviously changes can be made therein within the scope of the following claims.

We claim:

1. Apparatus for treating liquid sewage by bacterial digestion to recover clarified effluent water therefrom comprising:
   a. a main treatment tank having a wall which is essentially cylindrical about a horizontal axis and having closed ends, the diameter of the tank being no greater than its length;
   b. means for delivering raw sewage into the tank;
   c. a clarification compartment comprising a compartment wall which is essentially cylindrical about an axis that lies parallel to the axis of the tank, the compartment extending lengthwise within the tank with its compartment wall spaced from the tank wall, the compartment being closed at its ends, and the compartment having a longitudinal opening at its bottom communicating with the main tank;
   d. an air vent extending from inside the top of the compartment to a point above the liquid in the tank;
   e. effluent pipe means extending from within the compartment and passing outwardly through the main tank and operative to establish a liquid level in the tank and to deliver effluent water collected from the compartment;
   f. means offset from the horizontal axis of the tank and operative to bubble air upwardly between the tank and the compartment through the sewage to aerate the same and cause it to circulate about the compartment; and
   g. the walls and ends of the tank being substantially continuous and unbroken below the liquid level in the tank to promote circulation about said compartment with minimum turbulance, and the departure of effluent during such circulation being entirely through said clarification compartment and effluent pipe means.

2. The apparatus as set forth in claim 1, wherein the clarification compartment is about 10% of the main tank by volume.

3. The apparatus as set forth in claim 1, wherein the clarification compartment extends the full length of the tank and is fixed to the ends of the tank.

4. The apparatus as set forth in claim 1, wherein the axis of the compartment is parallel to but disposed above the axis of the tank by a distance not exceeding the radius of the compartment.

5. The apparatus as set forth in claim 1, wherein the interior of the compartment is diamond-shaped in cross-section, comprising longitudinal lower-wall plates converging toward the longitudinal opening, longitudinal upper-wall plates converging toward the top of the compartment near the vent and the upper and lower wall plates being respectively joined together at about the level of said effluent pipe.

6. The apparatus as set forth in claim 1, including filter means disposed near the bottom of said longitudinal opening and substantially completing the smooth outer contour of the compartment while discouraging the entry of solid matter from the tank into the compartment.

7. The apparatus as set forth in claim 6, wherein the filter means comprises screen means across said longitudinal opening and essentially conforming with the cylindrical contour of the compartment, and a filter medium comprising aggregate supported on said screen means and occupying a portion of the compartment lying below its axis.

8. The apparatus as set forth in claim 1, wherein said effluent pipe means comprises a horizontal pipe perforated at intervals along its lower periphery to admit water from the compartment, the pipe extending axially through most of the length of the compartment about mid-way between its top and bottom and having an exit portion extending upwardly out of the tank and having a discharge leading from said exit portion at a level near to but below the top of the tank; and means to prevent siphoning of the discharge and exit portion.

9. Apparatus as set forth in claim 1, wherein said air bubble means comprises a perforated horizontal pipe extending substantially through the length of the tank about mid-way between the tank and one side of the compartment below the vertical center of the tank, a perforated plastic air line removably inserted in the pipe and comprising a loose fit therein, and a source of air pressure outside the tank and coupled with said plastic line.

10. Apparatus as set forth in claim 1, wherein said main tank has a clean-out opening in its upper surface, and vented cover means manually closing said clean-out opening.

* * * * *